United States Patent Office 3,271,019
Patented Sept. 6, 1966

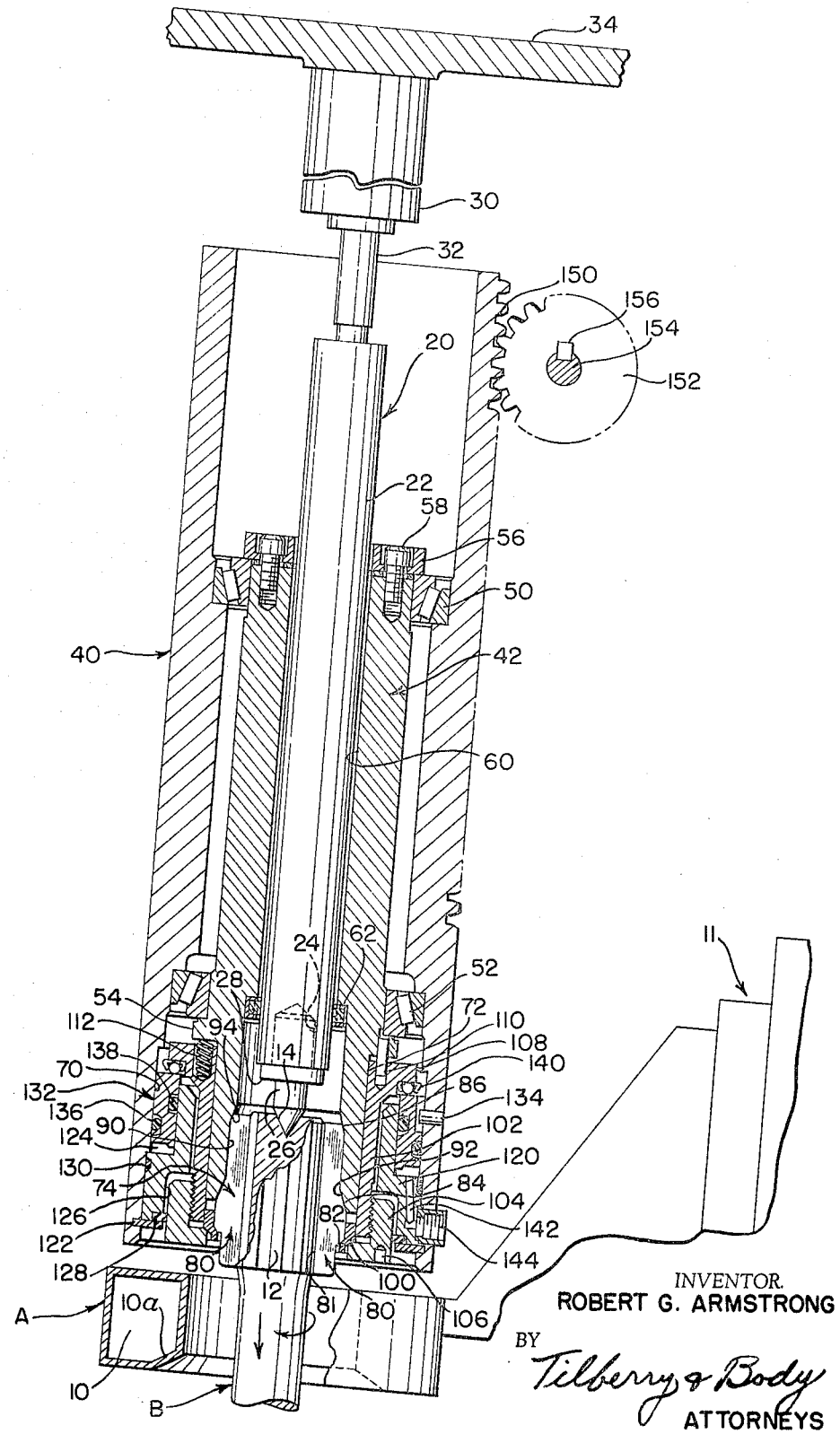

3,271,019
MECHANISM FOR AN INDUCTION HEATING
APPARATUS
Robert G. Armstrong, Chardon, Ohio, assignor to The Ohio Crankshaft Company, Cleveland, Ohio, a corporation of Ohio
Filed July 23, 1963, Ser. No. 297,109
8 Claims. (Cl. 266—4)

The present invention pertains to the art of induction heating and more particularly to a mechanism for exerting a tension creating force on an elongated workpiece while it is being heated in an induction heating apparatus.

The present invention is particularly applicable to a mechanism for exerting a tension creating force in an automotive axle shaft while it is being inductively hardened and the invention will be described with particular reference thereto; however, it is to be appreciated that the invention has much broader applications and may be used for applying an axial, tension creating force in a variety of elongated workpieces being inductively heated.

In manufacturing an automotive axle shaft it has become common practive to harden the outer periphery of the shaft by progressively heating the shaft along its length and then progressively quenching the heated portion to provide a hardened, outer shell. Such treatment of the shaft enables the shaft to withstand a greater amount of stress and thus, prolongs its life and effectiveness; however, it has been found that the axle shaft so treated tends to warp in a transverse direction while it is being heated and quenched. To overcome this difficulty, it has become common practice to provide the induction heating apparatus used in hardening such a shaft with means for rotating the shaft against a transverse restraint located near the midpoint of the shaft. Consequently, as the shaft is rotated against this restraint, there is a tendency for the restraint to straighten the shaft and compensate for any warpage thereof. In addition to such a restraint, it has recently been discovered that warpage or other distortions of the axle shaft as it is being inductively heat treated could be further limited by applying an axial tension creating force in the shaft.

Although this principle was known, there has been no mechanism for successfully applying this axial force onto the rotating elongated shaft, hereinafter, called the workpiece, as it is being progressively heated and quenched. One requirement of such a mechanism is that it allows scanning of the complete length of the workpiece without releasing control of the rotating workpiece. Accordingly, it is necessary for the inductor used in progressively heating the workpiece to scan the entire length of the workpiece including any area at which the mechanism is gripping the workpiece to apply an axial force thereon. In addition, such a mechanism should require very little space so that a plurality of workpieces can be heat treated in a single induction heating apparatus.

The present invention is directed toward a mechanism for an induction heating apparatus which mechanism satisfies the above-mentioned requirements and others.

In accordance with the present invention, there is provided a mechanism for an induction heating apparatus adapted to heat an elongated workpiece provided with a center countersink at least at one end, comprising a rotatable center, means for applying an axial force on the center to force the center against one end of the workpiece, a collet surrounding the workpiece adjacent the rotatable center, first means for contracting the collet into gripping engagement with the workpiece, means surrounding the center for supporting the collet, and means for applying a force on the support means in a direction substantially parallel to the axis of the workpiece to create a tension stress within the workpiece.

In accordance with another aspect of the present invention, there is provided a mechanism as defined which includes a means for releasing the collet and means for shifting the collet axially with respect to the center after the collet is released.

The primary object of the present invention is the provision of an apparatus for exerting a tension creating force on an elongated workpiece being progressively heated by an encircling inductor in an induction heating apparatus which mechanism is durable in use, relatively compact and adapted for use with conventional induction heating apparatus.

Another object of the present invention is the provision of an apparatus for exerting a tension creating force on an elongated workpiece being progressively heated by an encircling inductor in an induction heating apparatus which meachanism allows the inductor to scan the complete length of the elongated workpiece without losing control of the workpiece.

Still another object of the present invention is the provision of an apparatus for exerting a tension creating force on an elongated workpiece being progressively heated by an encircling inductor in an induction heating apparatus which apparatus includes a center for contacting the workpiece on one of its ends, a collet for gripping the workpiece adjacent the same end and means for applying a force on the collet to create an axial force in the workpiece.

Still another object of the present invention is the provision of an apparatus as defined above which apparatus includes means for retracting the collet over the center when the inductor approaches the collet end of the workpiece so that the inductor can scan the complete length of the workpiece.

These and other objects and advantages will become apparent from the following description used to illustrate the preferred embodiment of the present invention read in connection with the accompanying drawing in which there is shown a cross sectional view illustrating the preferred embodiment of the present invention.

Referring now to the drawing, wherein the showing is for the purpose of illustrating a preferred embodiment of the invention only and not for the purpose of limiting same, there is shown an inductor A having an internal quench passage 10 with angularly disposed quenching orifices 10a which inductor is connected onto a conventional induction heating apparatus 11 and is used for progressively hardening an elongated workpiece such as the fragmentarily shown, axle shaft B. In accordance with the illustrated embodiment of the invention, the axle shaft B, at the end shown, includes a splined end 12 and a center countersink 14. It is appreciated that the undisclosed end of the shaft includes a corresponding center countersink which cooperates with countersink 14 to define the desired rotational axis of the shaft B that is to be maintained in a relatively straight condition during the hardening of the shaft. The progressive scanning of the shaft B with the inductor A by first conductively heating the shaft and then quenching the shaft is a common operation in the induction heating art and requires no detailed discussion.

Adapted to coact with the center countersink 14 to support the shaft B on the desired axis, is a center 20 comprising an elongated rod 22, an end bore 24, and a pointed center piece 26 which is received in bore 24 and is held in the bore by appropriate means such as by threads or by a pressed fit. To determine the proper inward position of pointed piece 26, the piece is provided with a stop shoulder 28. At the opposite end of center 20 from the center piece 26 there is provided a cylinder 30 operated electrically, pneumatically, hydraulically or by other appropriate means and having a piston rod 32 adapted to be connected onto rod 22 for operation of the same in an axial direction. In accordance with the illustrated embodiment of the invention, the cylinder 30 is supported onto an appropriate means such as backing plate 34.

Surrounding the center 20 there is provided a collet support means or casing 40, which, in accordance with the illustrated embodiment of the present invention, is non-rotatable about the axis of rod 22. Within the casing 40 there is provided a spindle 42 rotatably mounted with respect to the casing by appropriately positioned thrust bearings 50, 52. To secure the spindle from axial movement with respect to casing 40, there is provided a flange 54 adjacent bearing 52 and a lock plate or cap 56 secured onto the spindle by a plurality of bolts 58. Since the center 20 may be non-rotatable, the spindle 42 is provided with a bore 60 which forms a loose fit with rod 22 and is sealed at the shaft end by appropriate packing 62.

As so far described, the spindle 42 freely rotates with respect to rod 22 and casing 40. At one end of casing 40 there is provided a generally annular chamber defined by enlarged bore 70 in the casing and cylindrical surface 72 of spindle 42. Within this annular chamber there is provided a collet assembly 74 adapted to contract around the splined end 12 of shaft B to grip this end in a concentric relationship with center 20.

The collet 74, in accordance with the preferred embodiment of the present invention, includes a plurality of circumferentially arranged gripping fingers 80 each having a relatively flat gripping surface 81, a downwardly facing shoulder 82, and cam surfaces 84, 86. The fingers 80 are positioned within bore 90 of spindle 42 which bore is provided with cam surfaces 92, 94 adapted to coact with cam surfaces 84, 86 respectively to force the gripping surface 81 into contact with the splined end 12 when the fingers are moved axially upward in bore 90. Below the fingers 80 there is provided an actuator ring 100 adapted to contact shoulder 82 and connected onto an actuator sleeve 102 by an appropriate coupling ring 104 having spanner holes 106 to clamp the ring 100 against shoulder 82. The upper end of sleeve 102 is provided with a flange 108 lying below flange 54 of spindle 42. The sleeve 102 slides along cylindrical surface 72 and is positioned with respect to spindle 42 by guide pins 110 and the sleeve is biased downwardly by a plurality of biasing springs 112.

Spaced outwardly from the sleeve 102 is another sleeve 120 locked onto casing 40 by appropriate means, such as snap rings 122. This sleeve 120 defines an annular fluid chamber 124 and has a lower recess 126 to accommodate the coupling ring 104. A sealing engagement is provided between ring 104 and sleeve 120 by a wiper 128 and the sleeve 120 is sealed with respect to casing 40 by seal 130.

Within chamber 124 there is provided an annular piston 132 having appropriate guide means such as a pin 134 and which is sealed with respect to casing 40 and sleeve 120 by seals 136, 138 respectively. The upper end of piston 132 bears against a thrust bearing 140 between the pistons and flange 108.

To direct fluid into chamber 124, there is provided an appropriate passage 142 in the sleeve 120 and communicated with the coupling 144 which is adapted to be connected to an appropriate supply of pressurized fluid such as air or hydraulic liquid so that the piston 132 can be operated in accordance with the pressure within chamber 124.

In accordance with the present invention, there is provided means for shifting the casing 40 axially with respect to center 20 when the fingers 80 are not in gripping relationship with the shaft B. Although a variety of structural embodiments could be utilized for this purpose, in accordance with the preferred embodiment of the present invention, there is provided a rack gear 150 along the side of casing 40 which rack gear coacts with a pinion gear 152 rotated by a shaft 154 through key 156. Accordingly, rotation of the shaft 154 causes reciprocal movement of casing 40 with respect to the center 20.

In operation, the shaft B is first located on the lower center, not shown, and then the cylinder 30 brings the center 20 into engagement with the shaft as shown in the drawing. Thereafter, a fluid is introduced into chamber 124 through passage 142 so that the ring 100 forces fingers 80 upwardly with respect to spindle 42 which causes these fingers to clamp the splined end 12 of the shaft B. The clamping geometry is so proportioned that the shaft is held with the axis of the shaft properly aligned. Having thus centered the shaft B, the inductor A commences moving upwardly from the bottom end of the shaft towards the top of the shaft by moving either the inductor or the shaft. By energizing the inductor, the shaft B is inductively heated and immediately thereafter by a fluid flowing through orifices 10a the heated portions of the shaft are quenched. During this heating and quenching operation, the shaft 154 is subjected to an appropriate torque to cause an upward force to be exerted on casing 40 which upward force is exerted through the gripping fingers 80 to the shaft B to maintain the shaft under tension. This has been found to greatly reduce the run-out of the shaft B as it is being heated and quenched.

When the inductor A reaches the uppermost position as shown in the drawing, it cannot move upwardly around the splined end 12 because of the collet assembly 74; therefore, the fluid pressure is automatically released from chamber 124 and the springs 112 release the fingers from gripping relationship with the splined end of the shaft so that rotation of shaft 154 raises the casing 40, and thus the spindle 42, upwardly around center 20. Accordingly, the inductor A can now move around the splined end and properly heat the splined end while the center 20 maintains the shaft in proper alignment.

It is apreciated that the pressure of the fluid or other actuating medium in cylinder 30 is released somewhat during the heating operation while the fingers 80 are in gripping relation with the splined end so that the upward force being exerted on casing 40 is not seriously hampered by the downward force being exerted on the shaft by the center 20.

The present invention has been discussed in connection with certain structural features of the preferred embodiment, however, it is to be appreciated that the invention is not to be so limited and that various changes may be made without departing from the intended spirit and scope of the present invention as defined in the appended claims.

Having thus described my invention, I claim:

1. In an induction heating apparatus for progressively hardening an elongated workpiece having a first and second end, said apparatus including a first and second center for locating said workpiece in said apparatus with the axis of said workpiece assuming a desired position with respect to said induction heating apparatus means for forcing said centers together to secure said workpiece within said apparatus, a first clamping device adjacent said first center for holding said first end of said workpiece, a second clamping device adjacent said second center for holding said second end of said workpiece, said clamping devices being rotatably mounted with respect to said apparatus, an inductor and quenching device positioned on said apparatus and encircling said workpiece, a quench passage associated with said device for quenching said workpiece after said workpiece has been heated by said device, means for rotating said workpiece about said axis and means for causing relative movement of said workpiece with respect to said inductor and quenching device with said relative movement being in the direction with said workpiece moving through said inductor and quenching device, the improvement comprising: said second clamping device comprising a rotatable clamping collet for gripping said second end of said workpiece, a non-rotatable frame member, means for supporting and jaurnalling said collet in said frame member and means for applying a controlled force on said frame member in a direction substantially parallel to said axis of said workpiece to create a tension within said workpiece as said inductor and quenching device scan and harden said workpiece.

2. The improvement as defined in claim 1 wherein said collet includes a fluid means for contracting said collet into gripipng engagement with said workpiece.

3. The improvement as defined in claim 2 wherein said fluid means includes an annular fluid chamber surrounding said collet, an annular piston in said chamber and means for selectively directing pressurized fluid into said chamber, and cam means for converting movement of said piston into said contracting movement of said collet.

4. The improvement as defined in claim 3, including a sleeve surrounding said collet and connected to said collect for contracting and expanding the same when the sleeve is moved axially with respect to said collet, means connecting said sleeve onto said piston, and means for converting movement of said piston into axial movement of said sleeve.

5. The improvement as defined in claim 4, wherein said piston and said chamber are supported in said non-rotatable frame member.

6. The improvement as defined in claim 1, including means for releasing said collet and for shifting said collet axially with respect to said centers after said collet is released from said workpiece.

7. The improvement as defined in claim 6, including a means for increasing the axial force of said centers against said workpiece when said collet is released.

8. The improvement as defined in claim 1, including means for decreasing the axial force exerted on said workpiece by said centers when said tension force is applied to said frame member.

References Cited by the Examiner

UNITED STATES PATENTS

| | | | |
|---|---|---|---|
| 2,293,534 | 8/1942 | Doneen et al. | 219—6.5 |
| 2,460,855 | 2/1949 | Somes | 266—4 |
| 2,464,658 | 3/1949 | Stivin | 219—7.5 |

JOHN F. CAMPBELL, *Primary Examiner.*

RICHARD M. WOOD, *Examiner.*

M. L. FAIGUS, *Assistant Examiner.*